(12) United States Patent
Koike et al.

(10) Patent No.: US 6,203,882 B1
(45) Date of Patent: Mar. 20, 2001

(54) HONEYCOMB-SHAPED CORDIERITE CATALYST CARRIER AND METHOD FOR PRODUCING THE SAME

(75) Inventors: Kazuhiko Koike, Nishio; Kojiro Tokuda, Chiryu; Tomohiko Nakanishi, Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/239,299

(22) Filed: Jan. 29, 1999

(30) Foreign Application Priority Data

Feb. 26, 1998 (JP) .................................. 10-064203
Nov. 16, 1998 (JP) .................................. 10-342374

(51) Int. Cl.$^7$ .................................................. B32B 3/12
(52) U.S. Cl. .................................................... 428/116
(58) Field of Search ............................................ 428/116

(56) References Cited

U.S. PATENT DOCUMENTS 4,755,493 * 7/1988 Takeuchi et al. ................... 501/134

FOREIGN PATENT DOCUMENTS 0 514 205   11/1992 (EP) .

\* cited by examiner

Primary Examiner—Francis J. Lorin
(74) Attorney, Agent, or Firm—Pillsbury Madison & Sutro LLP

(57) ABSTRACT

A cordierite honeycomb body is produced by forming a cordierite material including kaoline into a honeycomb shape and sintering it. The kaoline included in the cordierite material is at least partly composed of kaolinite having a Hinckley crystallinity index of 0.5 or more thereby having a less amorphous phase portion in a kaolinite particle. Therefore, when the cordierite material is sintered, the number of micropores generated in the cordierite is decreased due to the less amorphous phase portion in the kaolinite particles. As a result, density of the cordierite is increased without increasing a C.T.E. thereof. Thus, the cordierite honeycomb body has sufficient strength even when thickness of a cell wall thereof is decreased.

8 Claims, 2 Drawing Sheets

HONEYCOMB-SHAPED CORDIERITE CATALYST CARRIER AND METHOD FOR PRODUCING THE SAME

CROSS-REFERENCE TO RELATED APPLICATION

This application relates to and incorporates herein by reference Japanese Patent Application Nos. Hei. 10-64203 filed on Feb. 26, 1998 and 10-342374 filed on Nov. 16, 1998.

BACKGROUND OF THE INVENTION

1. Field of the Invention

The present invention relates generally to a catalytic converter for purifying an exhaust gas discharged from an internal combustion engine of a vehicle, and particularly to a producing method of a honeycomb-shaped catalyst carrier mainly made of cordierite.

2. Related Art

Conventionally, a cordierite honeycomb body made of cordierite and having a honeycomb shape is used as a catalyst carrier for carrying a catalyst for purifying an exhaust gas discharged from a vehicle engine. To produce the cordierite honeycomb body, source materials such as talc ($Mg_3Si_4O_{10}(OH)_2$), kaoline ($Al_2Si_2O_5(OH)_4$) and alumina ($Al_2O_3$) are mixed according to a desired cordierite composition. The mixture is formed into a desired honeycomb shape, and is sintered to become a cordierite honeycomb body.

Recently, it is necessary for the catalyst carrier for a vehicle to reduce a weight thereof and a pressure loss of exhaust gas flowing therethrough. Thickness of a cell wall of a cordierite honeycomb body consisting of the catalyst carrier may be decreased to meet this demand. However, when thickness of the cell wall is decreased, strength of the cordierite honeycomb body is also lessened. Thus, density of cordierite forming the cordierite honeycomb body needs to be increased so that strength of the cordierite honeycomb body is maintained even when thickness of the cell wall is decreased. For example, when thickness of the cell wall is decreased to 100 μm or less, porosity of cordierite forming the honeycomb body is preferably decreased to 20% or less so that the honeycomb body has sufficient strength.

It is known that cordierite material particles are finely grained or sintering aids are added to cordierite material so that density of cordierite is increased. However, these methods facilitate cordierite to be sintered, thereby increasing density of cordierite. Therefore, density of microcracks generated in cordierite and correlative with a coefficient of thermal expansion (hereinafter referred to as C.T.E.) of cordierite is also decreased. That is, in these methods, porosity of cordierite may be decreased, but the C.T.E. of cordierite may be increased. Thus, it is difficult to decrease porosity of cordierite so that density of cordierite is increased, while preventing the C.T.E. thereof from increasing. Further, when the cordierite honeycomb body having such a large C.T.E. is used as the catalyst carrier, a large thermal stress is generated by heat emitted while exhaust gas is purified by the catalyst carrier. As a result, cracks may occur in the catalyst carrier.

SUMMARY OF THE INVENTION

In view of the foregoing problems, it is an object of the present invention to provide a producing method of a cordierite honeycomb body which has sufficient strength even when thickness of a cell wall thereof is decreased, and has a low C.T.E. to be shock-resistant under heat.

According to the present invention, a cordierite honeycomb body is produced by mixing a cordierite material including kaoline, forming the mixed cordierite material into a honeycomb shape and sintering it. The kaoline is composed of at least partly kaolinite having a Hinckley crystallinity index of 0.5 or more. Therefore, the kaolinite particle has a less portion in an amorphous phase, and the number of micropores generated in the cordierite honeycomb body during the sintering process is decreased. When the kaolinite has the Hinckely crystallinity index of 0.5 or more, porosity of the cordierite honeycomb body is decreased to 20% and less. As a result, density of cordierite of the cordierite honeycomb body is increased without increasing a C.T.E. of cordierite. Thus, the cordierite honeycomb body has sufficient strength even when thickness of a cell wall thereof is decreased, while maintaining the low C.T.E. to be shock-resistant under heat.

Preferably, a ratio of the kaolinite with the Hinckley crystallinity index of 0.5 or more to the whole kaoline is in a range of 20–100% by weight.

Preferably, the cordierite material is sintered without sintering aides added thereto. The sintering aides facilitate the cordierite material to be sintered, thereby decreasing density of microcracks generated in the cordierite honeycomb body and increasing the C.T.E. thereof.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PREFERRED EMBODIMENT

A preferred embodiment of the present invention is described hereinafter with reference to the accompanying drawings.

In the embodiment, a cordierite material including kaoline is formed into a honeycomb shape, and is sintered to produce a honeycomb body mainly made of cordierite. Cordierite has a theoretical composition of $2MgO/2Al_2O_3/5SiO_2$. By weight, cordierite is theoretically composed of 49.0–53.0% $SiO_2$, 33.0–37.0% $Al_2O_3$, and 11.5–15.5% MgO.

In the present embodiment, kaoline ($Al_2Si_2O_5(OH)_4$) is used as a cordierite material. Kaoline is a generic name for minerals such as kaolinite, halloysite and dickite. At least part of kaoline used as the cordierite material is made of kaolinite, especially, kaolinite having a Hinckley crystallinity index (hereinafter referred to as Hinckley index) of 0.5 or more, so that porosity of the cordierite honeycomb body is decreased while a C.T.E. of the cordierite is prevented from being increased. The Hinckley index indicates a degree of a lamination irregularity.

Figure 1:
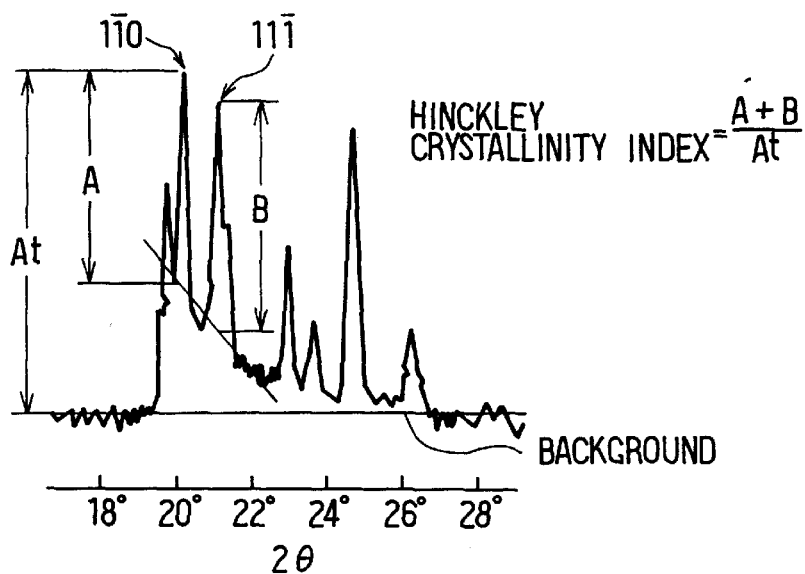
FIG. 1 is a chart showing an x-ray diffraction pattern of kaolinite according to a preferred embodiment of the present invention.

The Hinckley index is defined as follows. As shown in FIG. 1, the x-ray diffraction pattern of kaolinite has a $1\bar{1}0$ plane and a $11\bar{1}$ plane. The $1\bar{1}0$ plane has a diffraction strength A from an asymmetrical reflection (indicated by an inclined line in FIG. 1) caused by a lamination irregularity, and a diffraction strength At from a background. The $11\bar{1}$ plane has a diffraction strength B from the asymmetrical reflection. The diffraction strength A of the $1\bar{1}0$ plane is added to the diffraction strength B of the $11\bar{1}$ plane to obtain a sum A+B. The Hinckley index is calculated by dividing the sum A+B by the diffraction strength At of the $1\bar{1}0$ plane.

When the Hinckley index of kaolinite is large, a kaolinite particle has a less portion in an amorphous phase. As a result, the number of micropores generated in the crystallized cordierite is decreased. Especially, when kaolinite having the Hinckely index of 0.5 or more is used as a cordierite material, the number of micropores generated in the crystallized cordierite is largely decreased due to the less amorphous phase portion in kaolinite particles, thereby effectively increasing density of the cordierite. Thus, porosity of the cordierite honeycomb body can be decreased without fine-graining the cordierite material particles or adding sintering aides to the cordierite material. It is possible to decrease porosity of the cordierite honeycomb body to 35% or less, preferably, to 20% or less by using the cordierite material having an appropriate particle diameter.

Preferably, a ratio of kaolinite having the Hinckley index of 0.5 or more (hereinafter refereed to as specific kaolinite) to the whole kaoline is in a range of 20–100% by weight. When a ratio of the specific kaolinite to the whole kaoline is increased, a C.T.E. of the honeycomb body is decreased. However, when the ratio of the specific kaolinite to the whole kaoline is increased, a dehydrating reaction occurs while kaolinite is sintered, thereby causing cracks in the honeycomb body. Therefore, more preferably, a ratio of the specific kaolinite to the whole kaoline is in a range of 20–70% by weight, so that other kaoline or sintered kaoline (hereinafter referred to as calcinated kaoline) is also mixed.

Cordierite materials other than kaoline are not particularly specified. Oxide, hydroxide and chloride of Mg, Al and Si may be mixed according to a desired cordierite composition and used as a cordierite material. For example, talc ($Mg_3Si_4O_{10}(OH)_2$), alumina ($Al_2O_3$) and aluminum hydroxide ($Al(OH)_3$) are suitably used as a cordierite material because these materials are readily obtained and reasonably priced. Serpentine ($Mg_3Si_2O_5(OH)_4$), pyrophyllite ($Al_2Si_4O_{10}(OH)_2$), and magnesium hydroxide ($Mg(OH)_2$) are also suitably used as a cordierite material.

In the embodiment, a particle diameter of the specific kaolinite is not particularly specified, but is generally set to 0.1–20 $\mu$m, and is preferably set to 10 $\mu$m or less. Each particle diameter of the cordierite materials except the specific kaolinite such as kaoline is also not specified, but is generally set to 0.1–20 $\mu$m, and is preferably set to 10 $\mu$m or less. However, a particle diameter of talc is preferably set to a value in a range of approximately 2 to 10 $\mu$m so that the C.T.E. of cordierite is decreased. Generally, when a particle diameter of a cordierite material is decreased, porosity of a cordierite honeycomb body is also decreased. Thus, a particle diameter of the cordierite material is controlled so that the cordierite honeycomb body has desired porosity.

When a cordierite honeycomb body is made of the above-mentioned cordierite materials, kaoline including kaolinite having the Hinckley index of 0.5 or more and other cordierite materials are mixed according to a desired cordierite composition. Binder, lubricant, moisturizer, moisture or the like are added to the mixture of kaoline and the other cordierite materials, and are mixed together to become a mixed paste. If sintering aids are added to the mixed paste at this point, sintering of the cordierite is facilitated, thereby decreasing the number of microcracks generated in the cordierite. The microcracks function to decrease the C.T.E. of the cordierite. Therefore, preferably, sintering aids are not added to the mixed paste. Next, the mixed paste is extruded through an extrusion mold to be formed into a honeycomb shape, and is sintered at 1,400° C. in atmospheric air for several hours. Thus, a cordierite honeycomb body is obtained.

Figure 2:
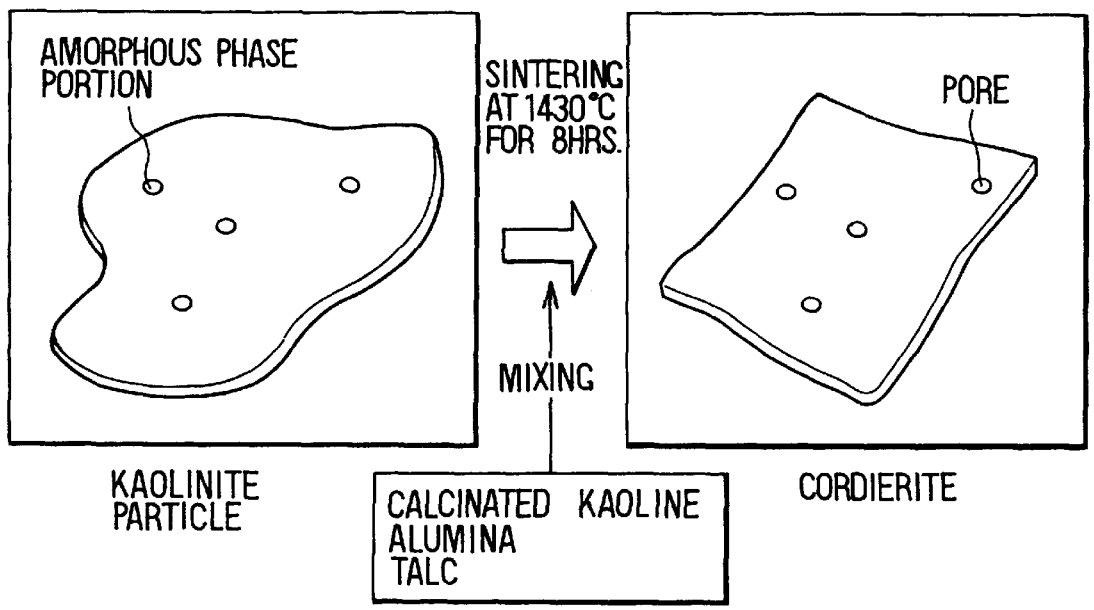
FIG. 2 is a schematic diagram showing a kaolinite particle and a cordierite according to the embodiment.

The obtained cordierite honeycomb structure has relatively small porosity and relatively high density. A mechanism for decreasing porosity of the cordierite is described with reference to FIG. 2. As shown in FIG. 2, kaolinite and other cordierite materials such as calcinated kaoline, alumina and talc are mixed and sintered under a condition shown in FIG. 2 to form a crystallized cordierite. During sintering, particles of kaolinite do not melt and function as nucleuses of crystallization. However, the kaolinite particle has plural amorphous phase portions with a size in the order of submicron or less. The amorphous phase portions in the kaolinite particle melt during sintering, thereby producing micropores in the crystallized cordierite. Thus, the amorphous phase portions in the kaolinite particles greatly concern formation of micropores in the cordierite during crystallization of the cordierite.

According to the embodiment, kaolinite used as the cordierite material has the Hinckley index of 0.5 or more and has a less amorphous phase portion in particles. Therefore, the number of micropores generated in the cordierite is decreased, thereby increasing density of the cordierite. In the embodiment, it is possible to decrease porosity of the cordierite honeycomb body to 20% or less. Thus, density of the cordierite honeycomb body is increased by appropriately controlling the Hinckley index and the particle diameter of the cordierite material, so that the cordierite honeycomb body has sufficient strength even when thickness of the cell wall thereof is decreased to around 100 $\mu$m.

EXAMPLES 1–7

Cordierite honeycomb body examples 1–7 are prepared as follows. Kaolinite, calcinated kaoline, talc, and alumina are respectively mixed at a ratio of 11.5%, 34.5%, 40.5%, 13.5% by weight to form a cordierite, so that the formed cordierite is composed of 51.5% $SiO_2$, 35.0% $Al_2O_3$ and 13.5% MgO by weight. Particle diameters of the calcinated kaoline, talc and alumina are respectively 0.8 $\mu$m, 11 $\mu$m, and 0.5 $\mu$m. As shown in TABLE 1, the particle diameter and the Hinckley index of kaolinite are varied between the examples 1–7. The particle diameter is varied in a range of 0.2–6.8 $\mu$m, and the Hinckley index is varied in a range of 0.52–1.14. A ratio of the specific kaolinite to the whole kaoline in the mixed material is 25% by weight in all the examples 1–7.

Next, binder, lubricant, moisturizer and an appropriate amount of moisture are added to the mixed cordierite materials, and are mixed together in a mixer. Binder is added to the mixed cordierite materials at 7.5% by weight, and lubricant and moisturizer are added at totally 2.8% by weight. The obtained mixed paste is extruded through a extrusion mold to be formed into a honeycomb shape, and is sintered in an electric furnace filled with atmospheric air of 1,435° C. for approximately 8 hours. Thus, the cordierite honeycomb body examples 1–7 are obtained.

Each of porosity and the C.T.E. of the obtained cordierite honeycomb body examples 1–7 are measured. The results are shown in TABLE 1. Porosity was measured through a mercury penetration method. The C.T.E. was measured through a push-rod thermal expansion measuring method. The C.T.E. is an average value calculated from plural measurements in a range of 25–800° C.

COMPARATIVE EXAMPLES 1–3

A comparative example 1 of the cordierite honeycomb body is produced using kaolinite having the Hinckley index of 0.42 and a particle diameter of 0.5 μm in the same procedure for producing the examples 1–7. Porosity and the C.T.E. of the comparative example 1 are measured in the same method as the examples 1–7, and are shown in Table 1. A comparative example 2 in which the mixed cordierite materials are crushed for 20 hours in a ball mill, and a comparative example 3 in which synthetic cordierite is added to the cordierite materials at 1% by weight as sintering aids are also prepared. Each of the comparative examples 2, 3 is also formed into the cordierite honeycomb body, and porosity and the C.T.E. thereof are measured in the same procedure as the examples 1–7. The results are also shown in TABLE 1.

Figure 3:
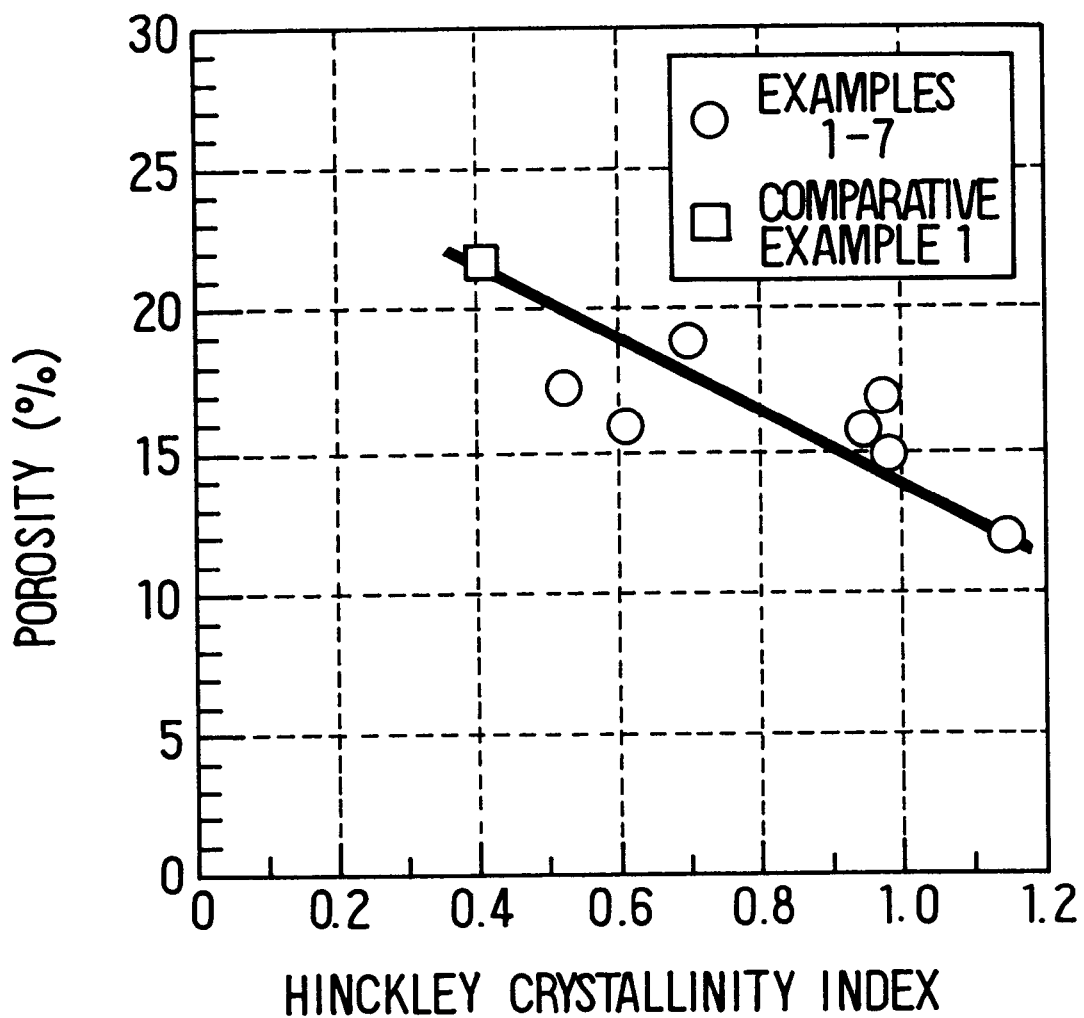
FIG. 3 is a graph showing a relation between porosity of a cordierite honeycomb body and a Hinckley crystallinity index of kaolinite according to the embodiment.

As shown in TABLE 1, each of the examples 1–7 in which kaolinite with the Hinckley index of 0.5 or more is used has porosity of 20% or less and a relatively low C.T.E. of $0.5 \times 10^{-6}/°$ C. or less, regardless of the size of the particle diameter of the kaolinite. A relation between the Hinckley index of the kaolinite and porosity of the cordierite according to TABLE 1 is shown in FIG. 3. As shown in FIG. 3, porosity of the cordierite is decreased as the Hinckley index of the kaolinite is increased. This is because the larger the Hinckley index becomes, the smaller the amorphous phase portions in the kaolinite particles become, thereby decreasing the number of micropores generated in the cordierite.

On the other hand, the comparative example 1 in which kaolinite with the Hinckley index of less than 0.5 is used has relatively large porosity of 23.9%, even though the particle diameter of the kaolinite is substantially the same as that of the examples 1–4 and is smaller than that of the examples 3, 5, 6. In the comparative example 1, the kaolinite has a relatively large amorphous phase portion in the particles, thereby generating a relatively large number of micropores in the cordierite. Thus, porosity of the cordierite depends on the Hinckley index of kaolinite more compared to the particle diameter of kaolinite. In the comparative example 2 in which the mixed cordierite material is fine-grained by crushing, porosity is as small as 12.2%, but the C.T.E. is as large as $0.83 \times 10^{-6}/°$ C. In the comparative example 2, since the particles of the cordierite material is fine-grained, sintering of the cordierite is facilitated and porosity of the cordierite is decreased. As a result, density of the microcracks in the cordierite is also decreased, thereby increasing the C.T.E. of the cordierite. In the comparative example 3, porosity is as small as 6.8%, but the C.T.E. is as large as $1.59 \times 10^{-6}/°$ C. In the comparative example 3, the sintering aids facilitate sintering of the cordierite similarly in the comparative example 2, thereby decreasing porosity and density of the microcracks. As a result, the C.T.E. of the comparative example 3 becomes relatively large.

EXAMPLES 8–14

Cordierite honeycomb body examples 8–14 are produced using kaolinite having the Hinckley index of 0.95 and a particle diameter of 0.5 μm. The ratios of the kaolinite to the whole kaoline are varied in a range of 20–100% by weight between the examples 8–14, as shown in TABLE 2. The examples 8–14 are formed and porosity and the C.T.E. thereof are measured through the same method as the examples 1–7. As shown in TABLE 2, each of the examples 8–14 has porosity of 20% or less and a relatively low C.T.E. Further, in the examples 8–14, the larger the ratio of the kaolinite to the whole kaoline is, the smaller the C.T.E. thereof is.

EXAMPLES 15, 16, COMPARATIVE EXAMPLE 4

Cordierite honeycomb body examples 15, 16 and comparative example 4 are prepared as follows. Kaolinite, calcinated kaoline, talc, alumina and aluminum hydroxide are respectively mixed by weight at a ratio of 10.5%, 32.0%, 38%, 4.5% and 15.0% to form a cordierite. Particle diameters of the kaolinite, calcinated kaoline, talc, alumina and aluminum hydroxide are respectively 0.5 μm, 5.5 μm, 8 μm, 1.0 μm and 1.5 μm. The mixed material is sintered at 1,390° C. for 4 hours to form a cordierite honeycomb body. As shown in TABLE 3, the Hinckley index of kaolinite is varied between the examples 15, 16 and comparative example 4. A ratio of the kaolinite to the whole kaoline in the mixed material is 24.7% by weight in the examples 15, 16 and the comparative example 4. Each porosity and C.T.E. of the examples 15, 16 and the comparative example 4 are measured. The results are shown in TABLE 3.

Generally, porosity of a cordierite honeycomb body depends on a particle diameter of a cordierite material, and the particle diameter of the cordierite material needs to be decreased so that porosity of the cordierite honeycomb body is decreased. According to the embodiment, since kaolinite having a large Hinckley index is used as a cordierite material, porosity of the cordierite honeycomb body can be decreased without decreasing the particle diameter of the cordierite material. For example, as shown in TABLE 3, the comparative example 4 having the Hinckley index of 0.42 has relatively large porosity of 38.6%. However, the examples 15, 16 with the Hinckley index of 0.5 or more have relatively small porosity around 35%, without decreasing a particle diameter or changing a mixing ratio of the cordierite materials.

Thus, in the embodiment, kaolinite having the Hinckley index of 0.5 or more is included in the cordierite material for forming a cordierite. Therefore, porosity of the formed cordierite honeycomb body is decreased, thereby increasing density of the cordierite without increasing the C.T.E. thereof. As a result, the cordierite honeycomb body has sufficient strength even when thickness of a cell wall thereof is decreased.

Although the present invention has been fully described in connection with preferred embodiments thereof with reference to the accompanying drawings, it is to be noted that various changes and modifications will become apparent to those skilled in the art.

Such changes and modifications are to be understood as being within the scope of the present invention as defined by the appended claims.

TABLE 1

| | No. | Kaolinite Particle diameter (μm) | Kaolinite Hinckely crystallinity index | Porosity (%) | C.T.E. (×10⁻⁶/° C.) | Remarks |
|---|---|---|---|---|---|---|
| Examples | 1 | 0.5 | 1.14 | 12.1 | 0.19 | |
| | 2 | 0.2 | 0.52 | 17.4 | 0.24 | |
| | 3 | 6.8 | 0.97 | 17.2 | 0.41 | |
| | 4 | 0.5 | 0.95 | 15.9 | 0.25 | |
| | 5 | 0.6 | 0.61 | 16.2 | 0.38 | |
| | 6 | 1.1 | 0.98 | 15.1 | 0.50 | |
| | 7 | 0.4 | 0.70 | 19.0 | 0.04 | |
| Comparative Examples | 1 | 0.5 | 0.42 | 23.9 | 0.17 | Crushed in ball mill |
| | 2 | 0.5 | 0.42 | 12.2 | 0.83 | 1% sintering aides added |
| | 3 | 0.5 | 0.42 | 6.8 | 1.59 | |

NOTES:
Talc with a particle diameter of 11 μm and alumina with a particle diameter of 0.5 μm are used for both Examples 1–7 and Comparative examples 1–3.

TABLE 2

| | No. | Kaolinite Particle diameter (μm) | Hinckely crystallinity index | Porosity (%) | C.T.E. (×10⁻⁶/° C.) | Ratio of specific kaolinite (% by weight) |
|---|---|---|---|---|---|---|
| Examples | 8 | 0.5 | 0.95 | 13.3 | 0.00 | 100.0 |
| | 9 | 0.5 | 0.95 | 13.6 | −0.09 | 80.0 |
| | 10 | 0.5 | 0.95 | 14.8 | 0.09 | 70.0 |
| | 11 | 0.5 | 0.95 | 14.9 | 0.20 | 50.0 |
| | 12 | 0.5 | 0.95 | 14.0 | 0.21 | 40.0 |
| | 13 | 0.5 | 0.95 | 15.2 | 0.21 | 30.0 |
| | 14 | 0.5 | 0.95 | 19.5 | 0.27 | 20.0 |

NOTES:
Calcinated kaoline with a particle diameter of 1.5 μm, talc with a particle diameter of 11 μm and alumina with a particle diameter of 1.1 μm are used for all Example 8–14.

TABLE 3

| | No. | Kaolinite Particle diameter (μm) | Hinckely crystallinity index | Porosity (%) | C.T.E. (×10⁻⁶/° C.) |
|---|---|---|---|---|---|
| Examples | 15 | 0.5 | 1.14 | 36.5 | 0.42 |
| | 16 | 0.5 | 0.95 | 36.2 | 0.43 |
| Comparative Example | 4 | 0.5 | 0.42 | 38.6 | 0.47 |

NOTES:
Calcinated kaoline with a particle diameter of 5.5 μm, talc with a particle diameter of 8 μm, alumina with a particle diameter of 1 μm and aluminum hydroxide with a particle diameter of 1.5 μm are used for both Examples 15, 16 and Comparative example 4.

What is claimed is:

1. A method for producing a cordierite honeycomb body, comprising the steps of:

mixing a cordierite material including kaoline;

forming said mixed cordierite material into a honeycomb shape; and sintering said honeycomb-shaped cordierite material, wherein:

said kaoline includes kaolinite having a Hinckley crystallinity index of 0.5 or more.

2. The method for producing a cordierite honeycomb body according to claim 1, wherein a ratio of said kaolinite to said kaoline is in a range of 20–100% by weight.

3. The method for producing a cordierite honeycomb body according to claim 1, wherein said sintering step is conducted without sintering aids added to said honeycomb-shaped cordierite material.

4. The method for producing a cordierite honeycomb body according to claim 1, wherein said cordierite material includes materials such as talc and alumina in addition to said kaoline at said mixing step.

5. A cordierite honeycomb body made of cordierite and formed into a honeycomb shape comprising:

cordierite formed by sintering kaolinite having a Hinckley crystallinity index of 0.5 or more.

6. The cordierite honeycomb body according to claim 5 further comprising kaoline, wherein a ratio of said kaolinite to said kaoline is in a range of 20–100% by weight.

7. The cordierite honeycomb body according to claim 5 further comprising talc and alumina.

8. The cordierite honeycomb body according to claim 5, wherein a particle diameter of said kaolinite is in a range of 0.1–20 μm.

* * * * *

UNITED STATES PATENT AND TRADEMARK OFFICE
CERTIFICATE OF CORRECTION

PATENT NO. : 6,203,882 B1
DATED : March 20, 2001
INVENTOR(S) : Koike et al.

Page 1 of 1

It is certified that error appears in the above-identified patent and that said Letters Patent is hereby corrected as shown below:

<u>Title page,</u>
Item [73], Assignee, change "Denso Corporation, Kariya (JP)" to -- DENSO Corporation, Kariya (JP) and Nippon Soken Inc., Nishio-city (JP) --

Signed and Sealed this

Twenty-third Day of April, 2002

Attest:

Attesting Officer

JAMES E. ROGAN
*Director of the United States Patent and Trademark Office*